US012737724B2

(12) United States Patent
Olsson et al.

(10) Patent No.: US 12,737,724 B2
(45) Date of Patent: Sep. 15, 2026

(54) VISUALIZING WORKFLOW PROCESSES WITH DECISION BRANCHES

(71) Applicant: ServiceNow, Inc., Santa Clara, CA (US)

(72) Inventors: Jan Ove Kristian Olsson, Castro Valley, CA (US); Min Wu, Pleasanton, CA (US); Yaron Guez, San Diego, CA (US); Nikhil Dvivedi, San Diego, CA (US); Jacob S. Burman, Carlsbad, CA (US); Brian P. Bimschleger, Highland Park, IL (US); Michel Abou Samah, San Diego, CA (US)

(73) Assignee: ServiceNow Inc., Santa Clara, CA (US)

( * ) Notice: Subject to any disclaimer, the term of this patent is extended or adjusted under 35 U.S.C. 154(b) by 126 days.

(21) Appl. No.: 18/389,535

(22) Filed: Nov. 14, 2023

(65) Prior Publication Data

US 2025/0156810 A1 May 15, 2025

(51) Int. Cl.
*G06Q 10/10* (2023.01)

(52) U.S. Cl.
CPC .................................. *G06Q 10/103* (2013.01)

(58) Field of Classification Search
CPC .................................................... G06Q 10/103
USPC .......................................................... 705/301
See application file for complete search history.

(56) References Cited

U.S. PATENT DOCUMENTS 12,169,802 B1 * 12/2024 Eldan ............... G06Q 10/06316
2002/0065701 A1 5/2002 Kim
2006/0074732 A1 4/2006 Shukla
2006/0259603 A1 11/2006 Shrader
2010/0198934 A1 8/2010 Ouchi
2016/0247246 A1 8/2016 Bluestone
2019/0236514 A1 * 8/2019 Schubert ................. G06F 9/451
2022/0036302 A1 * 2/2022 Cella .................. H04L 67/1097

* cited by examiner

*Primary Examiner* — Lindsay M Maguire
(74) *Attorney, Agent, or Firm* — FLETCHER YODER PC

(57) ABSTRACT

A computer workflow including computer managed activities organized in an execution ordering and one or more conditional branching decision nodes is specified. One or more activity execution conditions associated with at least one of the plurality of computer managed activities are determined, wherein the one or more activity execution conditions comprise at least one branch execution condition associated with at least one of the one or more conditional branching decision nodes. The computer workflow is executed. Based on at least one of the one or more activity execution conditions, it is determined whether a condition to start an execution of the at least one of the plurality of computer managed activities is satisfied. Based on the at least one branch execution condition, it is dynamically determined whether the at least one of the plurality of computer managed activities is to be visualized.

20 Claims, 10 Drawing Sheets

VISUALIZING WORKFLOW PROCESSES WITH DECISION BRANCHES

BACKGROUND OF THE INVENTION

Workflow management involves identifying, categorizing, structuring, tracking, documenting, and optimizing business tasks and processes to ensure that they proceed smoothly and accurately towards the desired results. A workflow management system provides an infrastructure for the set-up, performance, and monitoring of a defined sequence of tasks.

Correctly applied, workflow management brings together clear visibility, process automation, and support tools to guide people and processes. Additionally, teams that operate within reliable workflows see greater productivity and efficiency, and are more goal-oriented than those who do not. This comes from having easy access to workflow data, allowing for increased visibility into the steps and processes involved and which roles are responsible for which actions.

BRIEF DESCRIPTION OF THE DRAWINGS

Various embodiments of the invention are disclosed in the following detailed description and the accompanying drawings.

DETAILED DESCRIPTION

Figure 1:
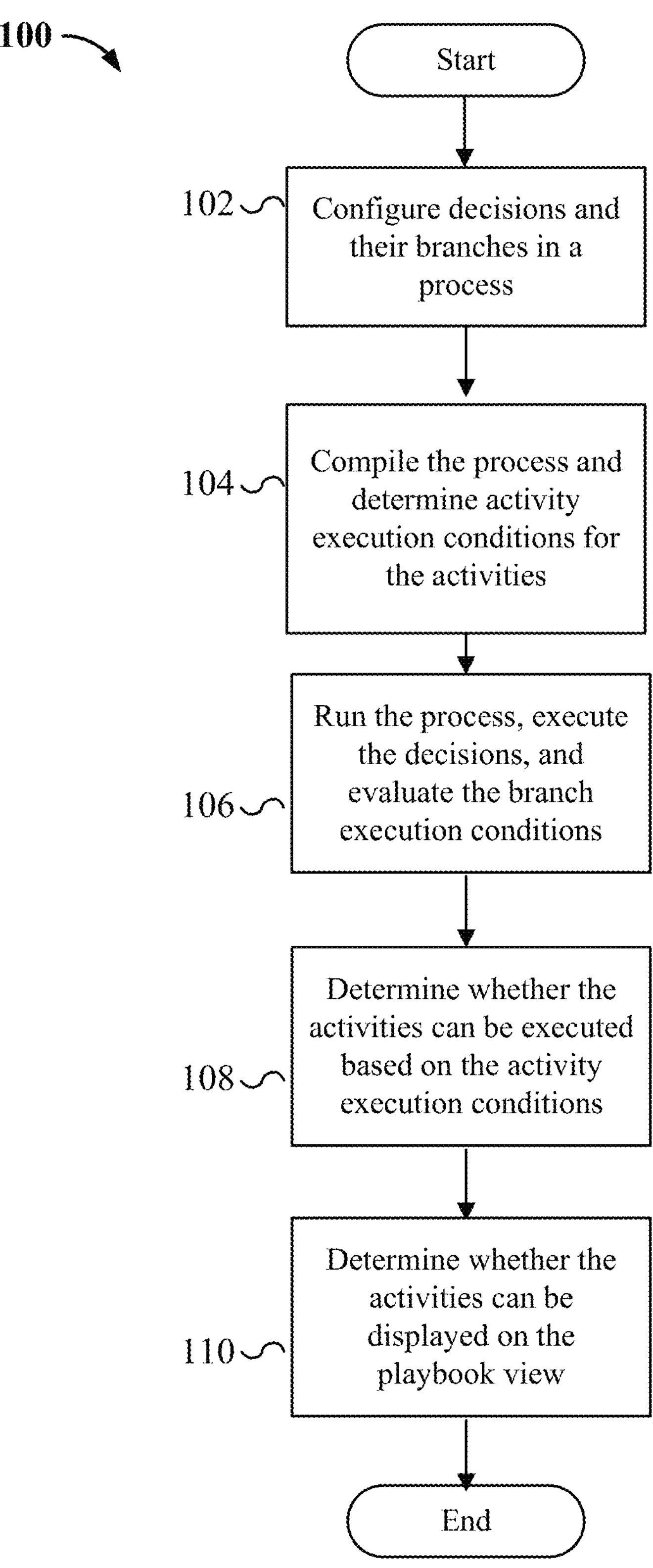
FIG. 1 illustrates an exemplary process 100 for a process automation designer system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The fundamental units of work are tasks, processes and workflows. A task is the basic building block of all work. Tasks are performed by individuals, but they can vary dramatically in complexity and time required for completion. Tasks may be divided into two types: single step and multi-step. When tasks are grouped together to achieve a desired result or objective, they form a process. For example, when an employee needs help solving an information technology (IT) issue, the employee initiates a process made up of multiple tasks. Processes that become interdependent with other people or processes are called workflows. A workflow comprises the interdependent processes and people required to reach a result that no single participant can achieve alone.

For example, submitting a help-desk request to IT is one element of a larger workflow that ultimately resolves the issue. Processes contained in the IT department are set in motion by requests, leading to prioritization, assignment, and fulfillment. The span of activities from problem to solution, and every person involved, comprises a workflow. The help-desk ticket workflow example may include a number of processes. During the first process, the employee with the broken equipment submits and tracks a help ticket. During the second process, Help Staff prioritizes and investigates the help ticket. During the third process, a technician visits the employee to see the problem in person. A process may include multiple tasks. For example, during the third process, the visit from a technician involves assigning the problem, determining the employee's location, and confirming that it is a good time for a visit, etc.

A cloud-based workflow management and automation tool may be used to allow users to design, build, and manage automated processes and workflows. There are a number of benefits that can be gained by using such a system, including improved efficiency, improved accuracy, better visibility, improved customer service, and the like.

For example, a workflow management and automation tool may provide step-by-step guidance for resolving processes and enable agents to easily manage the lifecycle of cases by guiding them through sequences of tasks. The workflows that are associated with a specific type of case and the activities that need to be completed to resolve cases of this type are detailed in the tool. The tool may also include a graphical user interface that helps users to visualize the entire lifecycle of a workflow.

However, existing workflow management and automation tools have different limitations and inefficiencies. For example, a workflow may go through different processes or tasks depending on the conditions or actions made by different participants involved in the workflow. It would be desirable for the management tool to dynamically display the processes, tasks, or activities that are predicted to execute given the conditions or actions made by the different participants that become known at different times. For example, once certain new conditions or actions are known, it would be desirable for the management tool to dynamically display the processes, tasks, or activities on a branch of the workflow branching from a decision that may be determined by these new conditions or actions. However, existing techniques and existing workflow management and automation tools either display too little information or too much information that may neither be relevant nor useful. For example, some existing management and automation tools may display the processes, tasks, or activities step-by-step as they are performed. Thus these tools display only the history of the routes or branches of the workflow that have been taken so far, but not any processes, tasks, or activities corresponding to any future predicted routes or branches based on known information. Some other existing management and automation tools may display all the processes, tasks, or activities corresponding to all the possible branches, even when only one of all the possible branches may ever be performed based on the already known information.

In the present application, improved techniques for a workflow management and automation tool are disclosed. A specification of a computer workflow is received, wherein the computer workflow includes a plurality of computer managed activities organized in an execution ordering and one or more conditional branching decision nodes, wherein at least one of the one or more conditional branching decision nodes is associated with two or more branches. One or more activity execution conditions associated with at least one of the plurality of computer managed activities are determined, wherein the one or more activity execution conditions comprise at least one branch execution condition associated with at least one of the one or more conditional branching decision nodes. The computer workflow is executed, including the one or more conditional branching decision nodes. Based on at least one of the one or more activity execution conditions, it is determined whether a condition to start an execution of the at least one of the plurality of computer managed activities is satisfied. Based on the at least one branch execution condition, it is dynamically determined whether the at least one of the plurality of computer managed activities is to be visualized.

In the present application, a process automation designer (PAD) that gives the process authors a simple, interactive way to design digitized and automated processes is disclosed. The process automation designer further provides a user interface (UI) for the agents to visualize the configured workflows and their processes. The user interface is also referred to as a playbook. A playbook allows an agent to visualize a workflow in a task-oriented view. A playbook takes a workflow process and breaks it into multiple stages or lanes. Each stage in a playbook includes one or more activities, or steps, for an agent to complete. The terms "activities," "steps," and "tasks" are herein used interchangeably. Stages can also include automated activities, such as sending an email to a customer when a stage or activity is complete. Agents may use a playbook for different purposes, including viewing the playbook stages and activities, selecting an activity and performing the work necessary to complete that activity, marking an activity as complete and moving to the next activity or stage, completing the stages and activities necessary to resolve the case, and the like. The capabilities provided by playbooks enable agents to quickly resolve customer issues. These capabilities work together to provide the agents with a better overall experience when using playbooks to resolve customer issues.

FIG. 1 illustrates an exemplary process 100 for a process automation designer system. A specification of a computer workflow is received, wherein the computer workflow includes a plurality of computer managed activities organized in an execution ordering and one or more conditional branching decision nodes, wherein at least one of the one or more conditional branching decision nodes is associated with two or more branches. At step 102, a plurality of decisions and their branches in a process are configured. The process automation designer provides the ability to add a decision node to a process and add/configure branches that should be taken in the process depending on different conditions. The design time UI enables simple low-code configuration of decisions and branches in a process. The data model enables the process authors to define the branches, the branch conditions, and the activities that are executed on the branches.

In particular, the design time UI allows process authors to add a decision node anywhere in the workflow diagram, and to add and remove branches. The authors may configure a condition on each branch when that branch should be executed. They may add activities onto a branch. When the process author adds a decision with a branch, the branch information and branch conditions persist on a dedicated decision activity definition. The first activity added on a branch has a new 'branches' start rule variable, which specifies which branch it should follow.

Figure 2:
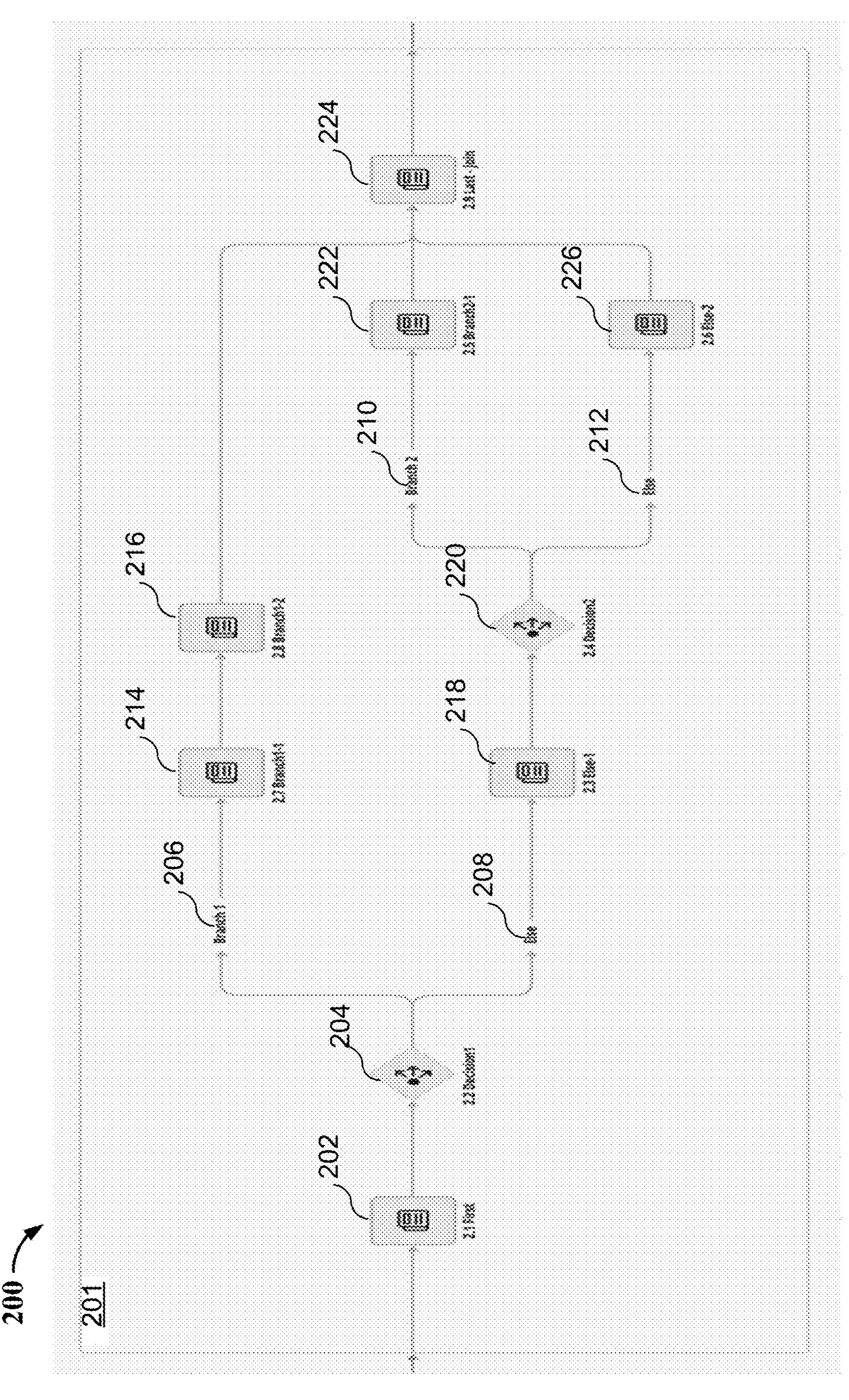
FIG. 2 illustrates an exemplary view 200 of a stage within a designed process.

FIG. 2 illustrates an exemplary view 200 of a stage within a designed process. For illustrative purposes only, the designed process is part of the help-desk ticket workflow example described above. The stage shown in view 200 corresponds to a stage at which agents may prioritize and investigate the help ticket.

View 200 in FIG. 2 illustrates a stage 201 that includes a plurality of activities, including activities 202, 214, 216, 218, 222, 224, and 226. Stage 201 includes one or more decision nodes, including decision nodes 204 and 220. Each decision node may be associated with a plurality of branches. For example, branches 206 and 208 are associated with decision node 204. And branches 210 and 212 are associated with decision node 220.

A decision node may include a set of conditionals (also known as conditional statements, conditional expressions, and conditional constructs), which are programming language commands for handling decisions. Specifically, conditionals perform different computations or actions depending on whether a programmer-defined Boolean condition evaluates to true or false. For example, a decision node may be configured as an if-then statement, if-then-else statement, if-then-elseif statement, and the like. As shown in FIG. 2, decision node 204 is configured as an if-then-else statement. In particular, decision node 204 is configured to evaluate a Boolean condition. If the Boolean condition is evaluated as True, then stage 201 proceeds to execute branch 206; else, the Boolean condition is evaluated as False, and stage 201 proceeds to execute the else branch, which is branch 208. Similarly, decision node 220 is configured as an if-then-else statement. In particular, decision node 220 is configured to evaluate another Boolean condition. If the Boolean condition is evaluated as True, then stage 201 proceeds to execute branch 210; else, the Boolean condition is evaluated as False, and stage 201 proceeds to execute the else branch, which is branch 212.

Figure 3:
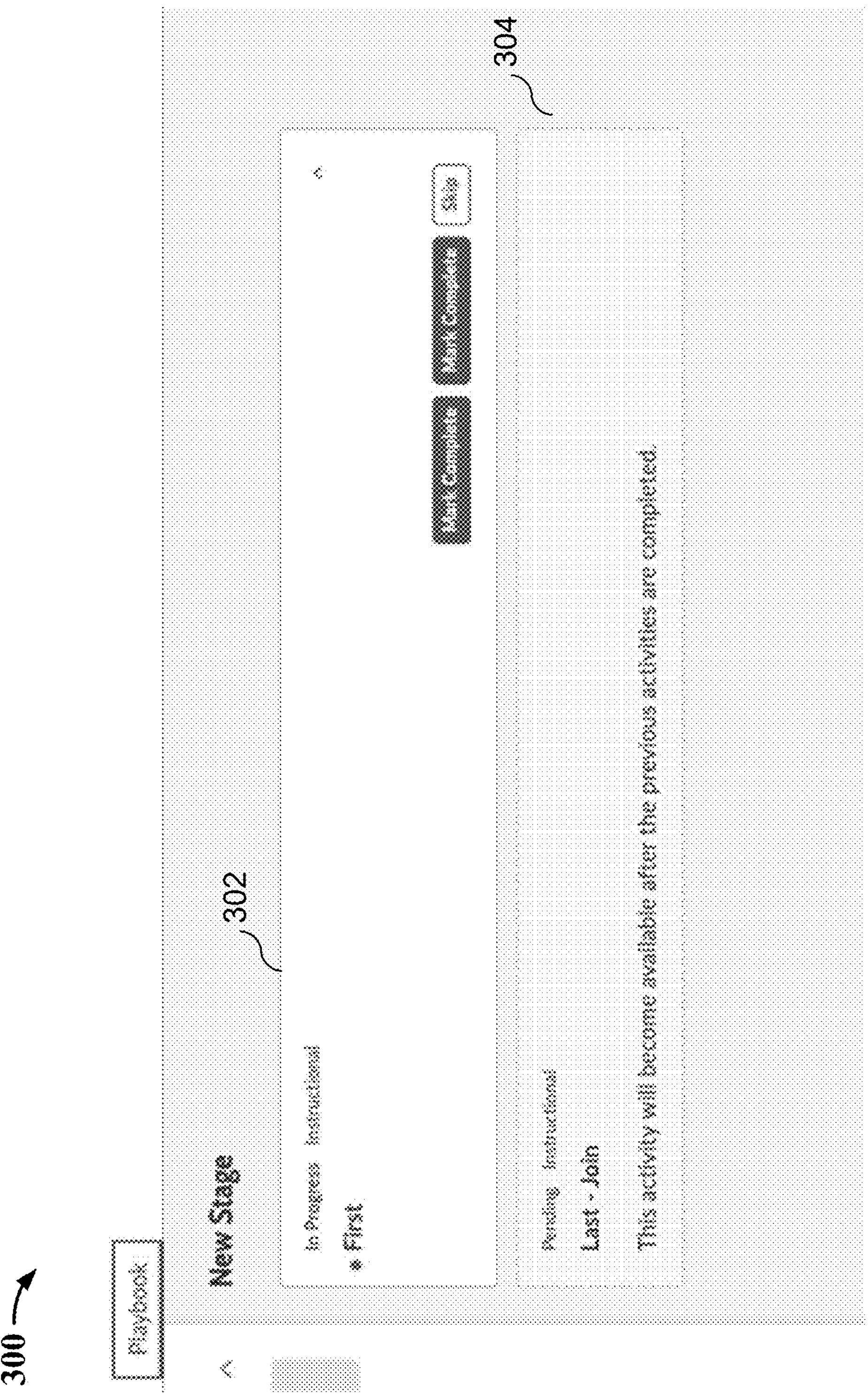
FIG. 3 illustrates an exemplary playbook view 300 for an agent to visualize stage 201 of FIG. 2 as the agent is investigating the help ticket.

FIG. 3 illustrates an exemplary playbook view 300 for an agent to visualize stage 201 of FIG. 2 as the agent is investigating the help ticket. Playbook view 300 is shown to the agent when activity 202 is in progress and being performed. As shown in playbook view 300, not all of the activities within stage 201 are displayed. In particular, only a panel 302 displaying the information and status of activity 202 (labeled as "First") and another panel 304 corresponding to activity 224 (labeled as "Last-Join") are listed in playbook view 300. Panels corresponding to the remaining activities (i.e., activities 214, 216, 218, 222, and 226) are not displayed on playbook view 300.

An initial playbook view, such as playbook view 300, always at least includes the panels corresponding to activities that are guaranteed to be performed at some point in time because their execution is independent of any pending decisions and therefore is not waiting for any particular decision results. These activities are merely waiting for their respective turns of execution based on the configured execution order within the stage.

Panel 302 for displaying the information and status of activity 202 and panel 304 for displaying the information and status of activity 224 are always listed in a playbook view for stage 201. Panel 302 is always shown because it is the first activity in stage 201 and it is known by the system that activity 202 will be performed irrespective of any pending decisions. As activity 202 is in progress, the agent is provided with different icons (e.g., "Mark Complete" or "Skip") to interact with or control the activity.

Similarly, panel 304 is always shown because it is the last activity in stage 201 and it is known by the system that activity 224 will be performed irrespective of any pending decisions. This is because the system may predict that all the branches (including branches 206, 208, 210, and 212) in stage 201 will merge together and finally reach activity 224 at the end of the stage. Activity 224 is merely waiting for its turn of execution based on the configured execution order within the stage, i.e., after activity 216, activity 222, or activity 226 is complete. As activity 224 is still pending, the agent is not provided with any icons to interact with or control activity 224. The agent is instead notified that "This activity will become available after the previous activities are completed."

However, there are no panels corresponding to the remaining activities (e.g., activities 214, 216, 218, 222, and 226) listed on playbook view 300. The reason they are not displayed is because decisions that will affect which branches and therefore which of these activities may be executed have not been made or are not known yet. As stage 201 progresses and as decisions and conditions become available, some of the branches that should be taken become known to the system, and therefore playbook view 300 may be updated dynamically to show the activities on those branches.

Figure 4:
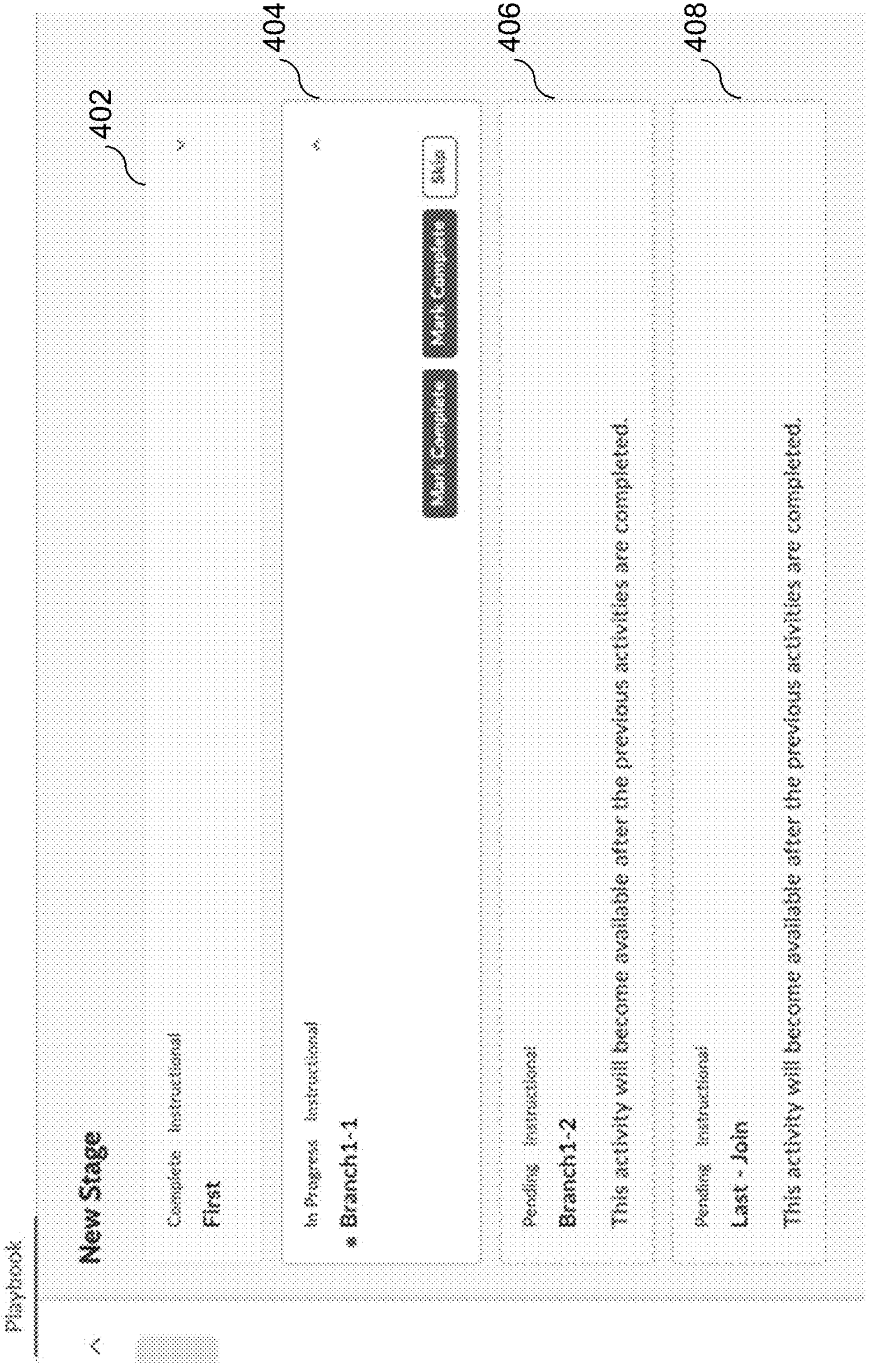
FIG. 4 illustrates another exemplary playbook view 400 for an agent to visualize stage 201 of FIG. 2 as the agent is investigating the help ticket.

FIG. 4 illustrates another exemplary playbook view 400 for an agent to visualize stage 201 of FIG. 2 as the agent is investigating the help ticket. Playbook view 400 is shown to the agent when activity 214 is in progress and being performed. Similar to playbook view 300, playbook view 400 includes a panel 402 displaying the information and status of activity 202 (labeled as "First") and another panel 408 corresponding to activity 224 (labeled as "Last-Join"). In addition, an additional panel 404 displaying the information and status of activity 214 (labeled as "Branch 1-1") and another panel 406 corresponding to activity 216 (labeled as "Branch 1-2") are shown in playbook view 400. Panels corresponding to the remaining activities (i.e., activities 218, 222, and 226) are not displayed on playbook view 400.

Panel 404 for displaying the information and status of activity 214 is shown because activity 214 is in progress, and therefore the agent is provided with different icons (e.g., "Mark Complete" or "Skip") to interact with or control the activity.

Panel 406 for displaying the information and status of activity 216 is also listed in playbook view 400 because its execution is independent of any pending decisions and therefore is not waiting for any particular decision results. Activity 216 is merely waiting for its turn of execution based on the configured execution order within the stage, i.e., after activity 214 is complete. As activity 216 is still pending, the agent is not provided with any icons to interact with or control activity 216. The agent is instead notified that "This activity will become available after the previous activities are completed."

Referring back to process 100 in FIG. 1, at step 104, the process is compiled and activated. The activity execution conditions that must be evaluated to TRUE before the activities should be executed are calculated and stored. For each activity, any conditions that are required to be evaluated to True before the activity may execute are calculated. These may be stored as part of each activity context record for process execution.

Referring back to FIG. 2, some activities do not have any branch execution conditions that are required to be evaluated to True before the activities may execute. Activities that are not located on any branches have no required branch execution conditions. For example, activity 202 is not located on any branches. For activity 202, the activity's execution condition is based only on whether the activity's parent is in a terminal state, i.e., if the parent is complete or skipped. Activity 202 has no parent, and therefore it may run as soon as stage 201 begins.

Some activities have one or more branch execution conditions that are required to be evaluated to True before the activities may be executed. For example, activity 214 is the first activity on branch 206, and therefore branch 206 must evaluate to TRUE before activity 214 may execute. Activity 216 is the second activity on branch 206, and therefore branch 206 must evaluate to TRUE and activity 216's parent (i.e., activity 214) must be in a terminal state before activity 216 may execute. Activity 222 is the first activity on branch 210, which branches off from branch 208, and therefore branch 208 and branch 210 must both evaluate to TRUE before activity 222 may execute.

Some activities are not being located on any branches, but these activities may have branch execution conditions that are required to be evaluated to TRUE before the activities may execute. Activity 224 in FIG. 2 is determined as not being located on any branches because all the branches (including branches 206, 208, 210, and 212) in stage 201 merge together and finally reach activity 224 at the end of the stage. For activity 224, the activity's execution condition is based only on whether the activity's parent is in a terminal state, i.e., if the parent is complete or skipped. For example, activity 224's parent is activity 216 if branch 206 is TRUE, its parent is activity 222 if branch 208 and branch 210 are TRUE, and its parent is activity 226 if branch 208 and branch 212 are TRUE.

Referring back to process 100 in FIG. 1, at step 106, the process is run. During runtime, the decisions of the process are executed and the branch execution conditions are evaluated. Referring back to FIG. 2, decision node 204 is executed and branch 206 and branch 208 are evaluated, where either branch 206 or branch 208 is evaluated as TRUE. Decision node 220 is also executed during runtime, and branch 210 and branch 212 are evaluated, where either branch 210 or branch 212 is evaluated as TRUE.

At step 108, it is determined whether the activities can be executed based on their respective activity execution conditions. The activity execution conditions that must be evaluated to TRUE before a particular activity can be executed were previously calculated and stored in the activity context record at step 104 (i.e., during compile time). Therefore, the stored activity execution conditions may now be evaluated during runtime to determine whether the activity can execute or not, which is not computationally intensive and can be evaluated instantly.

At step 110, during runtime, which activities to show or hide on playbook views may be determined. In the playbook UI, only activities that are known that they will execute will be shown. For example, an activity that is on a branch will not be shown on the playbook view until it is known that the branch will evaluate to TRUE. In some embodiments, when a new branch execution condition becomes available, the playbook UI may be notified to refresh and re-render the playbook view, such that any activities on the branch that are evaluated as TRUE may be rendered on the view.

Activities that are not located on any branches have no required branch execution conditions to meet before they are shown on the playbook views. The branch execution condition for such an activity is set to NULL. For example, activity 202 is not located on any branches. Therefore, as shown in FIG. 3, panel 302 for displaying the information and status of activity 202 is always listed in a playbook view for stage 201. Activity 224 is not located on any branches because it is determined that all the branches (including branches 206, 208, 210, and 212) in stage 201 will merge together and finally reach activity 224 at the end of the stage. The branch execution condition for activity 224 is set to NULL. Therefore, as shown in FIG. 3, panel 304 for displaying the information and status of activity 224 is always listed in a playbook view for stage 201.

An activity that is on a branch is shown on the playbook view when the branch is evaluated as TRUE. For example, after decision node 204 has been executed and branch 206 is evaluated as TRUE, both activity 214 and activity 216 are displayed. As shown in FIG. 4, panel 404 for displaying the information and status of activity 214 is shown, and panel 406 for displaying the information and status of activity 216 is also listed in playbook view 400.

The advantages of a process automation manager described above have many advantages. In some other workflow management tools, users may only configure conditions on individual lanes or activities to determine if that individual lane or activity should execute or be skipped. The process automation manager disclosed herein enables more complex processes to be built with advanced decision logic with conditions determining which branch should execute next. Users may configure more complex branching scenarios that apply to all activities or lanes on that branch.

Figure 5:
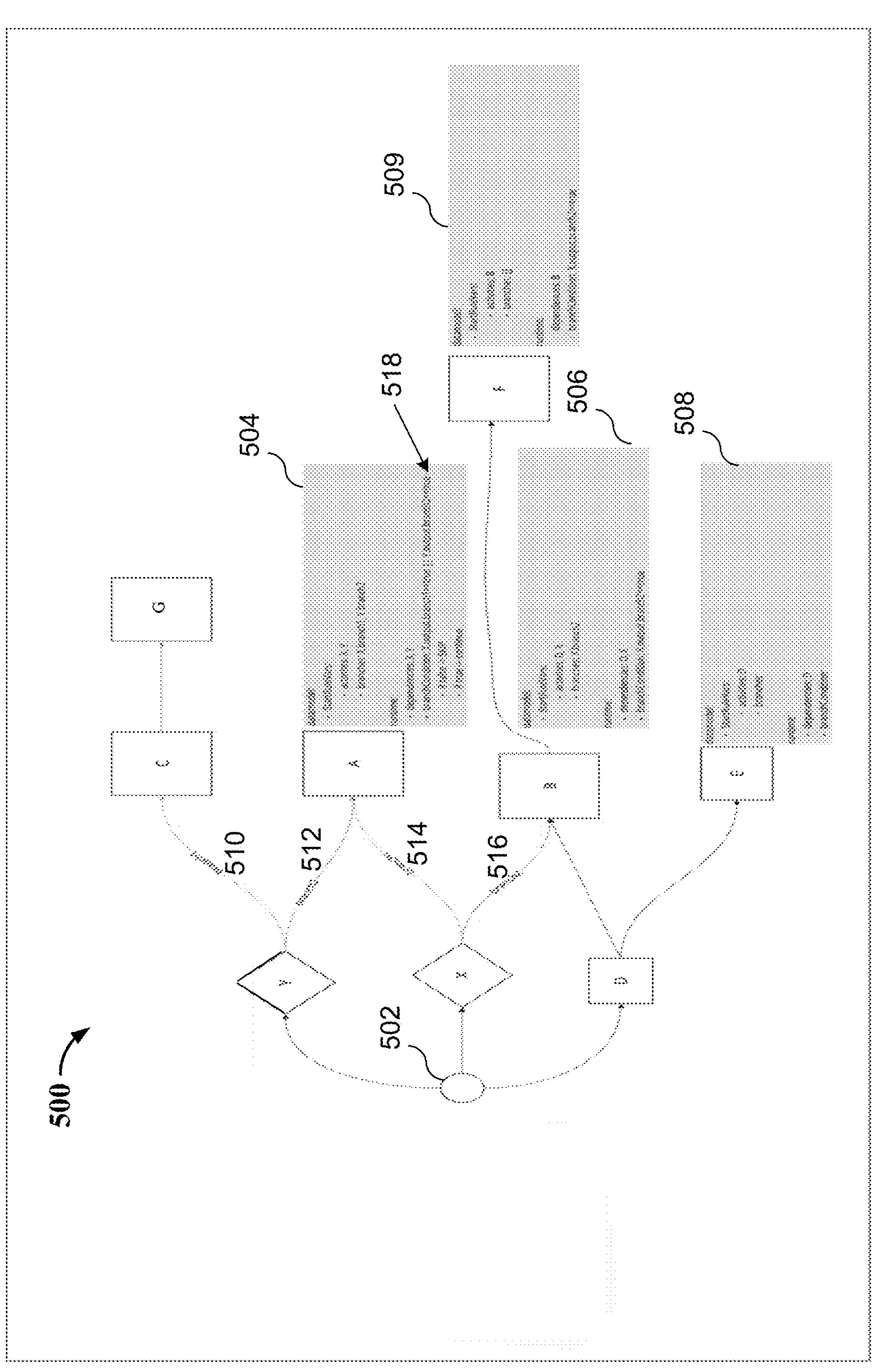
FIG. 5 illustrates an exemplary stage 500 for a process automation designer system with its data model and runtime behavior.

FIG. 5 illustrates an exemplary stage 500 for a process automation designer system with its data model and runtime behavior. Stage 500 includes a starting node 502. Stage 500 includes a plurality of activities, including activities A, B, C, D, E, F, and G. Stage 500 includes two decision nodes, X and Y. Each decision node may be associated with a plurality of branches. For example, branches 510 and 512 are associated with decision node Y and branches 514 and 516 are associated with decision node X.

Each activity has its own data model (e.g., data models 504, 506, 508, and 509) in a database for storing the compiled down activity execution conditions, including branch execution conditions and parent termination conditions that are determined at step 104 of process 100 in FIG. 1. The start rule variables (StartRuleVars) are stored on the activity instance record, which is saved by the designer. The branchConditions (and dependencies) are stored on the activity context record, which is used at runtime.

For example, the start rules in the data model 506 of activity B indicate that activity B is executed after activity D or decision X. The start rules also indicate that activity B is executed after branch 516 (with a notation of X.branch2). The runtime activity execution conditions include parent termination conditions (or dependencies) of activity D and decision X. The runtime activity execution conditions also include a branch execution condition of X.output.branch2==TRUE. During runtime, the stored activity execution conditions may be evaluated to determine whether the activity can execute or not. For activity B, the parent termination conditions (or dependencies) are activity D and decision X. The branchCondition of X.output.branch2 must be evaluated as TRUE.

The start rules in the data model 509 of activity F indicate that activity F is executed after activity B. However, the start rules have branches set to NULL. In other words, the start rules do not have any information that activity B is located on branch 516 at design time. The runtime activity execution conditions include parent termination conditions (or dependencies) of activity B. The runtime activity execution conditions also include a branch execution condition of X.output.branch2==TRUE. During runtime, the stored activity execution conditions may be evaluated to determine whether the activity can execute or not. For activity F, the parent termination condition (or dependency) is activity B. The branchCondition of X.output.branch2 must be evaluated as TRUE.

Figure 6:
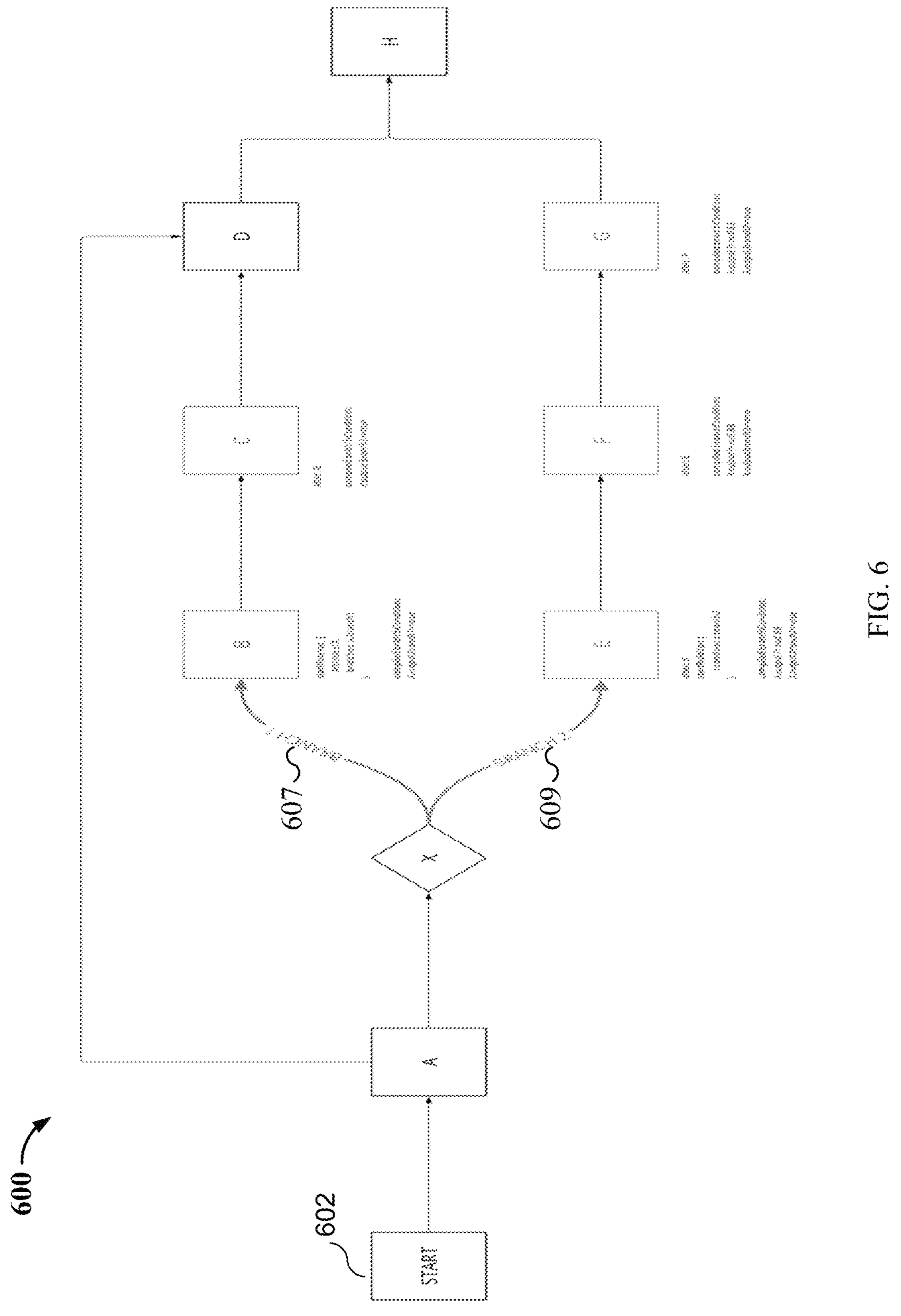
FIG. 6 illustrates another exemplary stage 600 for a process automation designer system with its data model and runtime behavior.

FIG. 6 illustrates another exemplary stage 600 for a process automation designer system with its data model and runtime behavior. Stage 600 includes a starting node 602. Stage 600 includes a plurality of activities, including activities A, B, C, D, E, F, G, and H. Stage 600 includes one decision node X. Decision node X may be associated with branch 607 or branch 609.

Each activity has its own data model in a database for storing the compiled down activity execution conditions, including branch execution conditions and parent termination conditions that are determined at step 104 of process 100 in FIG. 1.

For example, the start rules in the data model of activity B indicate that activity B is executed after decision X. The start rules also indicate that activity B is executed after branch 607 (with a notation of X.branch1). The compiled branch execution condition is X.output.branch1==TRUE. During runtime, X.output.branch1 must be evaluated as TRUE.

The start rules in the data model of activity C indicate that activity C is executed after activity B. However, the start rules do not have any information that activity C is located on branch 607. The compiled branch execution condition is X.output.branch1==TRUE. During runtime, X.output-.branch1 must be evaluated as TRUE.

Figure 7:
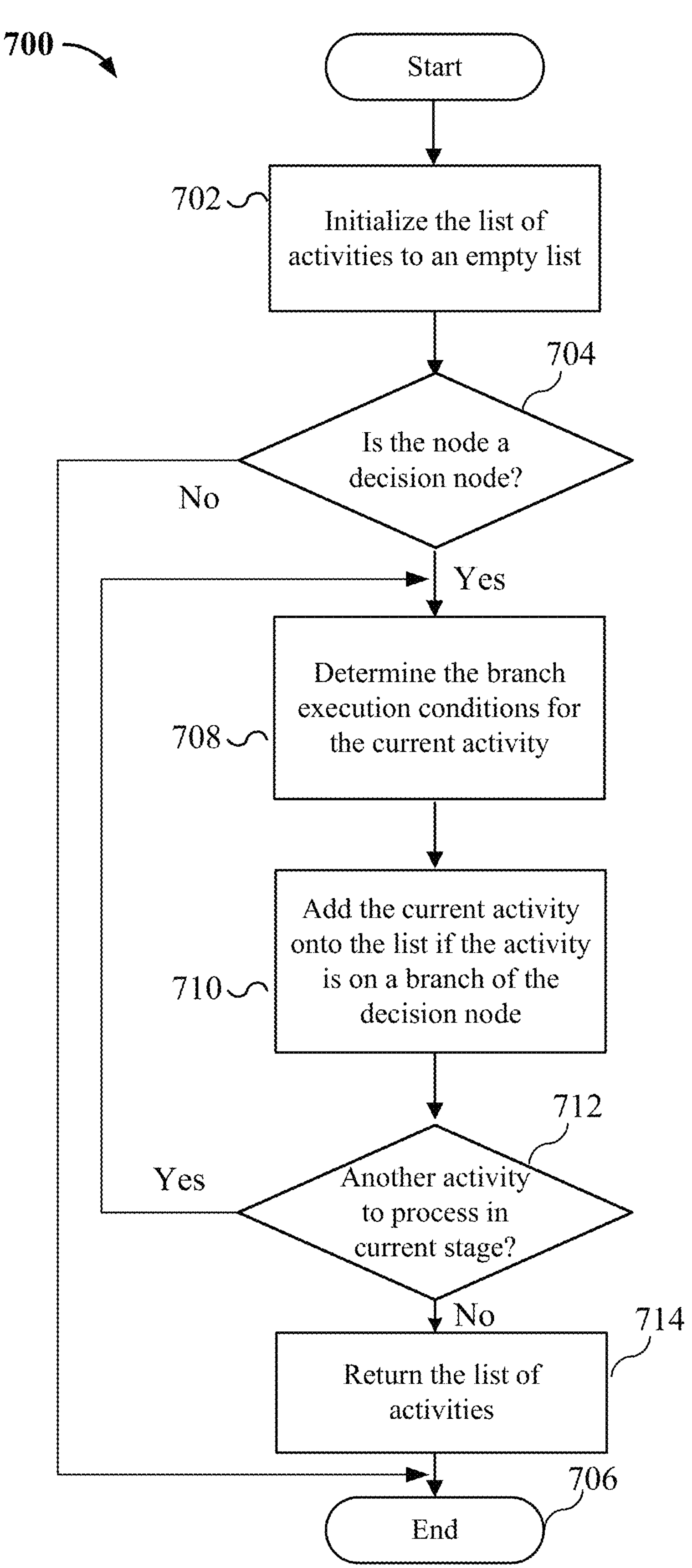
FIG. 7 illustrates an exemplary process 700 (getBranchActivities) that is performed to determine all the activities that are on the branches of a decision node.

FIG. 7 illustrates an exemplary process 700 (get-BranchActivities) that is performed to determine all the activities that are on the branches of a decision node. In some embodiments, process 700 is performed at step 104 of process 100 of FIG. 1. Process 700 is performed such that when a decision is evaluated, the UI may be refreshed to show all the activities on the decided branch on the playbook view.

At step 702, the list of activities that are on the branches of a particular decision node is initialized to an empty list.

At step 704, it is determined whether the current node is a decision node. If the node is not a decision node, then process 700 proceeds to 706 and the process is terminated. If the node is a decision node, process 700 proceeds to step 708.

Steps 708 and 710 are executed in a loop that loops through all the activities in the stage. At step 708, the branch execution conditions of the current activity are determined. At step 710, if the current activity is on a branch of the decision node, then the current activity is added onto the list of activities. At step 712, it is determined whether there is another activity in the current stage that needs to be processed next. If there are no more activities to process, then process 700 proceeds to step 714; otherwise, process 700 proceeds back to step 708 and the loop is executed again. At step 714, the list of activities that are on the branches of the decision node is returned. At step 706, process 700 is terminated.

Figure 8:
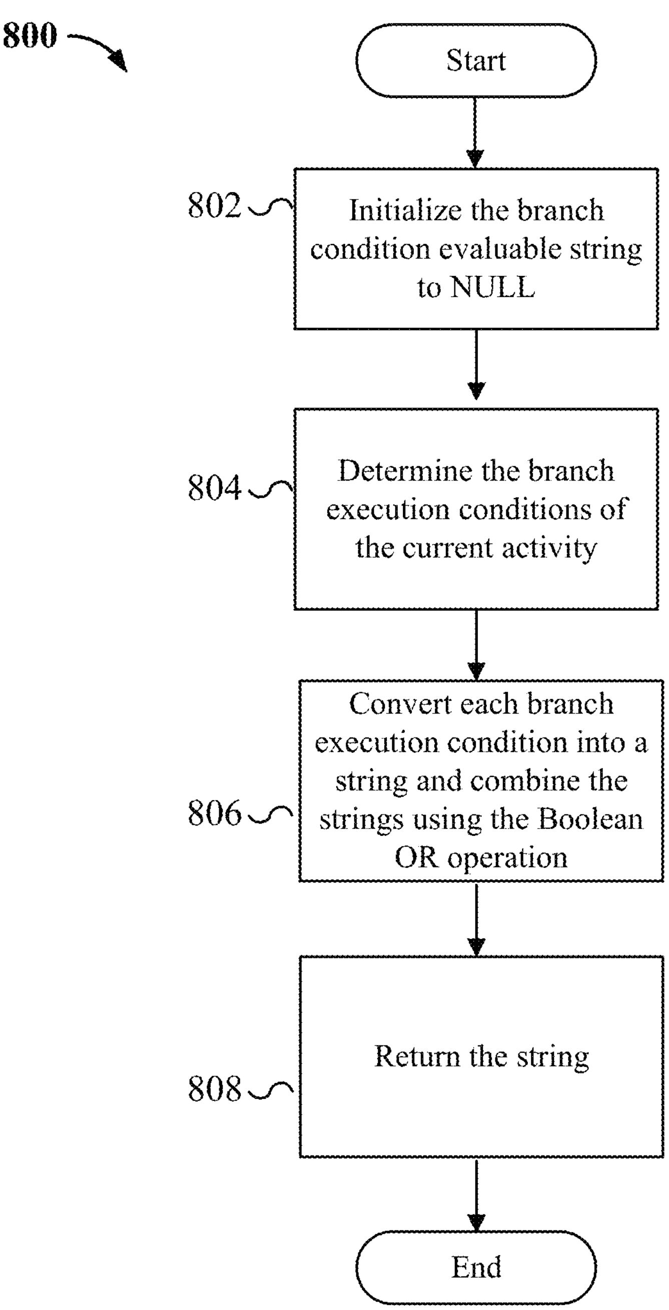
FIG. 8 illustrates an exemplary process 800 (getBranchConditions) that is performed to calculate and return all the branch conditions for an activity to run as an evaluable string.

FIG. 8 illustrates an exemplary process 800 (get-BranchConditions) that is performed to calculate and return all the branch conditions for an activity to run as an evaluable string. For example, the branch condition evaluable string may be 'activityId1.output.branchId1=true/\ORactivityId2.output.branchId2=true.' In some embodiments, process 800 is performed at step 104 of process 100 of FIG. 1. Process 800 is performed to determine whether an activity is on a branch and what branch conditions for the activity to execute.

At step 802, the branch condition evaluable string is initialized as NULL. At step 804, the branch execution conditions of the current activity are determined. At step 806, each of the branch execution conditions is converted into a string and the strings are combined together using the Boolean OR operation to form the branch execution evaluable string for the activity. At step 808, the branch execution evaluable string for the activity is returned.

Referring back to the example in FIG. 5, process 800 may be used to determine the branch execution conditions for the activities. For example, the branch condition evaluable string for activity B may be determined by process 800 as X.output.branch2==TRUE. The branch condition evaluable string for activity A is (X.output.branch1==TRUE||Y.output.branch2==TRUE) (see 518 of FIG. 5).

Figure 9:
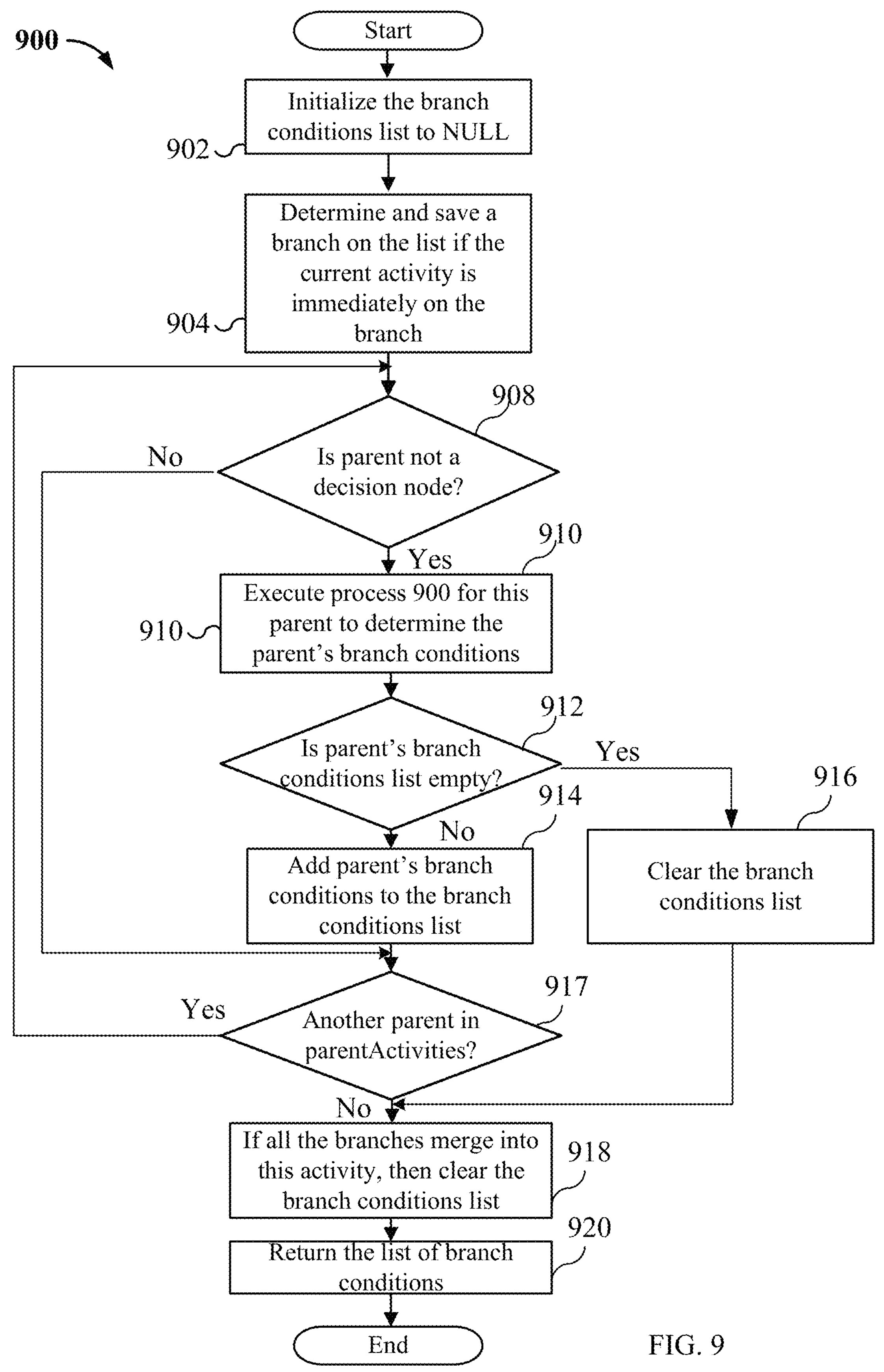
FIG. 9 illustrates an exemplary process 900 (getBranchConditionsInternal) that is performed to calculate and return all the branch conditions in order for the current activity to execute.

FIG. 9 illustrates an exemplary process 900 (get-BranchConditionsInternal) that is performed to calculate and return all the branch conditions in order for the current activity to execute. The calculation of all the branch conditions is performed by traversing all dependencies. In some embodiments, process 900 is a common process that may be executed at step 708 of process 700 or step 804 of process 800.

At step 902, the branch conditions list for the current activity is initialized to an empty list (i.e., NULL).

At step 904, if the current activity is immediately on a branch, the branch is determined and returned. For example, referring back to FIG. 5, the start rules in the data model indicate that activity B is executed after branch 516 (with a notation of X.branch2). X.branch2 is the determined and returned branch. The start rules in the data model 509 of activity F indicate that activity F is not a first activity immediately and directly on any branches. Therefore, the returned branch is set to NULL. The returned branch is then saved into the branch conditions list for the current activity.

Steps 908, 910, 912, 914, and 916 are steps executed within a loop that loops through all the parents of the current activity. At step 908, it is determined whether this parent is not a decision node. If this parent is a decision node, then process 900 proceeds to step 917 to process the next parent, if any; otherwise, process 900 proceeds to step 910. At step 910, process 900 is recursively called again for this parent. In other words, process 900 is called to calculate and return all the branch conditions in order for this parent to execute. Next it proceeds to step 912.

At step 912, it is determined whether the parent's branch conditions list is empty. If the parent's branch conditions list is empty, then process 900 proceeds to step 916. At step 916, the branch conditions list is cleared and then process 900 proceeds to step 918. This is because if any direct parent is not on a branch, then this activity does not depend on a branch condition and therefore the branch conditions list should be set to empty. If the parent's branch conditions list is not empty, then at step 914, the parent's branch conditions are added to the branch conditions list.

At step 917, it is determined whether there is another parent in the parentActivities list. If there are no more parents to process, then process 900 proceeds to step 918; otherwise, process 900 proceeds back to step 908 to process another parent.

At step 918, it is determined whether all the branches merge back into this activity. If all the branches merge back into this activity, then the branch conditions list is cleared. At step 920, the branch conditions list is returned, and the process is terminated.

Figure 10:
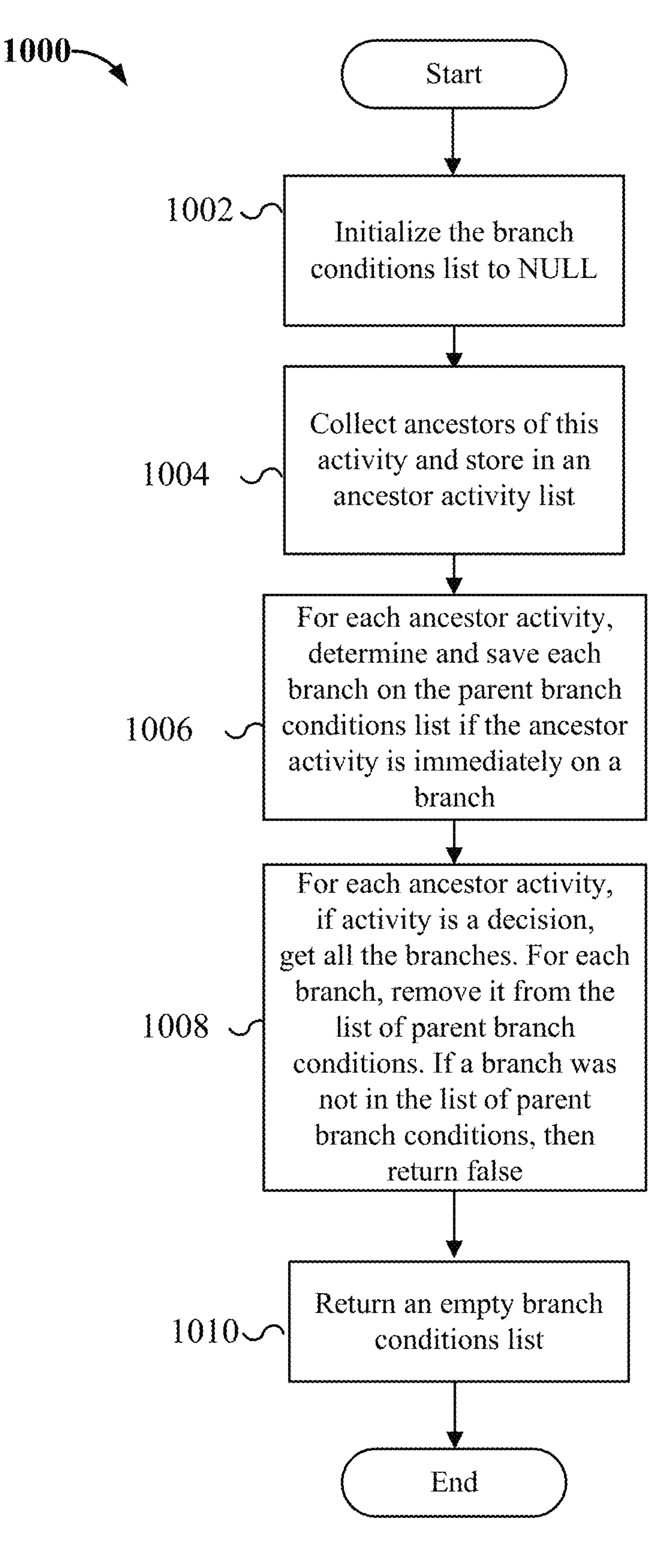
FIG. 10 illustrates an exemplary process 1000 (doesAllBranchLeadHere) that is performed to check if all branches lead back to this activity.

FIG. 10 illustrates an exemplary process 1000 (doesAll-BranchLeadHere) that is performed to check if all branches lead back to this activity. In other words, the process determines whether all the branches merge back into this activity. In some embodiments, process 1000 is executed at step 918 of process 900. At step 1002, the parent branch conditions list is initialized to an empty list (i.e., NULL) to indicate that there are zero branch execution conditions. At step 1004, ancestors of this activity are collected and stored in an ancestor activity list. At step 1006, for each ancestor activity, determine and save each branch on the parent branch conditions list if the ancestor activity is immediately on a branch. At step 1008, for each ancestor activity, if activity is a decision, then get all the branches. For each branch, remove it from the list of parent branch conditions. If a branch was not in the list of parent branch conditions collected in step 1006, then return false. At step 1010, if the parent branch conditions list is empty, return true. If the parent branch conditions list isn't empty, return false.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:

receiving a specification of a computer workflow including a plurality of computer managed activities organized in an execution ordering including one or more conditional branching decision nodes, wherein at least one of the one or more conditional branching decision nodes is associated with two or more branches;

determining a first activity execution condition and a second activity execution condition associated respectively with a first computer managed activity and a second computer managed activity of the plurality of computer managed activities, wherein the first activity execution condition and the second activity execution condition comprise a branch execution condition associated with at least one of the one or more conditional branching decision nodes;

identifying a third computer managed activity in the computer workflow downstream of the one or more conditional branching decision nodes;

determining that all branches originating from the one or more conditional branching decision nodes merge into the third computer managed activity by recursively traversing one or more ancestor activities of the third computer managed activity;

clearing a branch condition list associated with the third computer managed activity and assigning a NULL branch execution condition to the third computer managed activity in response to determining that all branches merge into the third computer managed activity;

generating and transmitting for display a graphical user interface (GUI) corresponding to the computer workflow;

executing the computer workflow including the one or more conditional branching decision nodes;

based on the first activity execution condition, determining that a condition to start an execution of the first computer managed activity is satisfied; and updating the GUI to display first computer managed activity GUI elements and second computer managed activity GUI elements based on the branch execution condition being satisfied, and third computer managed activity GUI elements based on the NULL branch execution condition.

2. The method of claim 1, further comprising:

determining that at least one of the plurality of computer managed activities is located on a particular branch of the two or more branches, and is not directly behind a conditional branching decision node associated with the particular branch in the execution ordering, and is directly behind a parent activity in the execution ordering;

setting an additional branch execution condition associated with the at least one of the plurality of computer managed activities to the particular branch having been evaluated by the conditional branching decision node as being chosen to be executed; and setting a parent termination condition associated with the at least one of the plurality of computer managed activities to the parent activity having been evaluated as terminated or skipped.

3. The method of claim 2, further comprising:

in response to determining that the additional branch execution condition associated with the at least one of the plurality of computer managed activities and the parent termination condition associated with the at least one of the plurality of computer managed activities are both satisfied, determining that the condition to start the execution of the at least one of the plurality of computer managed activities is satisfied.

4. The method of claim 2, further comprising:

in response to determining that the additional branch execution condition associated with the at least one of the plurality of computer managed activities is satisfied and that a parent termination condition associated with the at least one of the plurality of computer managed activities is not yet satisfied, updating the GUI to display one or more additional GUI elements including at least one of the plurality of computer managed activities before the execution of the at least one of the plurality of computer managed activities.

5. The method of claim 1, further comprising:

determining that at least one of the plurality of computer managed activities is not located on the two or more branches, and is directly behind a parent activity in the execution ordering;

setting an additional branch execution condition associated with the at least one of the plurality of computer managed activities to NULL, wherein NULL is having zero branch execution conditions; and setting a parent termination condition associated with the at least one of the plurality of computer managed activities to the parent activity having been evaluated as terminated or skipped.

6. The method of claim 5, further comprising:

in response to determining that the parent termination condition associated with the at least one of the plurality of computer managed activities is satisfied, determining that the condition to start the execution of the at least one of the plurality of computer managed activities is satisfied.

7. The method of claim 5, further comprising:

in response to determining that the additional branch execution condition associated with the at least one of the plurality of computer managed activities is set to NULL, updating the GUI to display the one or more GUI elements including the at least one of the plurality of computer managed activities before an execution of the at least one of the plurality of computer managed activities, wherein NULL is having zero branch execution conditions.

8. The method of claim 1, further comprising:

determining that all branches in the computer workflow merge into at least one of the plurality of computer managed activities; and setting an additional branch execution condition associated with the at least one of the plurality of computer managed activities to NULL, wherein NULL is having zero branch execution conditions.

9. The method of claim 8, further comprising:

in response to determining that the additional branch execution condition associated with the at least one of the plurality of computer managed activities is set to NULL, updating the GUI to display one or more GUI elements including the at least one of the plurality of computer managed activities before the execution of the at least one of the plurality of computer managed activities, wherein NULL is having zero branch execution conditions.

10. The method of claim 1, wherein the determining of the first activity execution condition and the second activity execution condition is performed at compile time of the computer workflow.

11. The method of claim 1, wherein the executing of the one or more conditional branching decision nodes is performed at runtime of the computer workflow.

12. The method of claim 1, wherein recursively traversing the one or more ancestor activities of the third computer managed activity comprises:

storing the one or more ancestor activities in an ancestor activity list;

for each ancestor activity in the ancestor activity list, determining and storing each branch on a parent branch conditions list if the ancestor activity is on the branch;

for each ancestor activity in the ancestor activity list, retrieving one or more branches associated with the ancestor activity and removing the one or more branches from the parent branch conditions list to determine an empty list state;

wherein determining that all branches originating from the one or more conditional branching decision nodes merge into the third computer managed activity is based on determining the empty list state.

13. A system, comprising:

a processor configured to:

receive a specification of a computer workflow including a plurality of computer managed activities organized in an execution ordering including one or more conditional branching decision nodes, wherein at least one of the one or more conditional branching decision nodes is associated with two or more branches;

determine a first activity execution condition and a second activity execution condition associated respectively with a first computer managed activity and a second computer managed activity of the plurality of computer managed activities, wherein the first activity execution condition and the second activity execution condition comprise a branch execution condition associated with at least one of the one or more conditional branching decision nodes;

identify a third computer managed activity in the computer workflow downstream of the one or more conditional branching decision nodes;

determine that all branches originating from the one or more conditional branching decision nodes merge into the third computer managed activity by recursively traversing one or more ancestor activities of the third computer managed activity;

clear a branch condition list associated with the third computer managed activity and assign a NULL branch execution condition to the third computer managed activity in response to determining that all branches merge into the third computer managed activity;

generate and transmit for display a graphical user interface (GUI) corresponding to the computer workflow;

execute the computer workflow including the one or more conditional branching decision nodes;

based on the first activity execution condition, determine whether a condition to start an execution of the first computer managed activity is satisfied; and update the GUI to display first computer managed activity GUI elements and second computer managed activity GUI elements based on the branch execution condition being satisfied, and third computer managed activity GUI elements based on the NULL branch execution condition; and a memory coupled to the processor and configured to provide the processor with instructions.

14. The system of claim 13, wherein the second activity execution condition comprises a parent termination condition of the first computer managed activity.

15. The system of claim 13, wherein the processor is configured to:

determine that at least one of the plurality of computer managed activities is located on a particular branch of the two or more branches, and is not directly behind a conditional branching decision node associated with the particular branch in the execution ordering, and is directly behind a parent activity in the execution ordering;

set an additional branch execution condition associated with the at least one of the plurality of computer managed activities to the particular branch having been evaluated by the conditional branching decision node as being chosen to be executed; and set a parent termination condition associated with the at least one of the plurality of computer managed activities to the parent activity having been evaluated as terminated or skipped.

16. The system of claim 15, wherein the processor is configured to:

in response to determining that the additional branch execution condition associated with the at least one of the plurality of computer managed activities and the parent termination condition associated with the at least one of the plurality of computer managed activities are both satisfied, determine that the condition to start the execution of the at least one of the plurality of computer managed activities is satisfied.

17. The system of claim 15, wherein the processor is configured to:

in response to determining that the additional branch execution condition associated with the at least one of the plurality of computer managed activities is satisfied and that the parent termination condition associated with the at least one of the plurality of computer managed activities is not yet satisfied, update the GUI to display one or more additional GUI elements including the at least one of the plurality of computer managed activities before the execution of the at least one of the plurality of computer managed activities.

18. The system of claim 13, wherein the processor is configured to:

determine that at least one of the plurality of computer managed activities is not located on the two or more branches, and is directly behind a parent activity in the execution ordering;

set an additional branch execution condition associated with the at least one of the plurality of computer managed activities to NULL, wherein NULL is having zero branch execution conditions; and set a parent termination condition associated with the at least one of the plurality of computer managed activities to the parent activity having been evaluated as terminated or skipped.

19. The system of claim 18, wherein the processor is configured to:

in response to determining that the additional branch execution condition associated with the at least one of the plurality of computer managed activities is set to NULL, update the GUI to display one or more GUI elements including the at least one of the plurality of computer managed activities before the execution of the at least one of the plurality of computer managed activities, wherein NULL is having zero branch execution conditions.

20. A computer program product embodied in a non-transitory computer readable medium and comprising computer instructions for:

receiving a specification of a computer workflow including a plurality of computer managed activities organized in an execution ordering including one or more conditional branching decision nodes, wherein at least one of the one or more conditional branching decision nodes is associated with two or more branches;

determining a first activity execution condition and a second activity execution condition associated respectively with a first computer managed activity and a second computer managed activity of the plurality of computer managed activities, wherein the first activity execution condition and the second activity execution condition comprise a branch execution condition associated with at least one of the one or more conditional branching decision nodes;

identifying a third computer managed activity in the computer workflow downstream of the one or more conditional branching decision nodes;

determining that all branches originating from the one or more conditional branching decision nodes merge into the third computer managed activity by recursively traversing one or more ancestor activities of the third computer managed activity;

clearing a branch condition list associated with the third computer managed activity and assigning a NULL branch execution condition to the third computer managed activity in response to determining that all branches merge into the third computer managed activity;

generating and transmitting for display a graphical user interface (GUI) corresponding to the computer workflow;

executing the computer workflow including the one or more conditional branching decision nodes;

based on the first activity execution condition, determining whether a condition to start an execution of the first computer managed activity is satisfied; and updating the GUI to display first computer managed activity GUI elements and second computer managed activity GUI elements based on the branch execution condition being satisfied, and third computer managed activity GUI elements based on the NULL branch execution condition.

* * * * *